US010671516B2

(12) United States Patent
Nie et al.

(10) Patent No.: US 10,671,516 B2
(45) Date of Patent: Jun. 2, 2020

(54) METHOD, DEVICE, AND COMPUTER PROGRAM PRODUCT FOR TESTING CODE

(71) Applicant: EMC IP Holding Company LLC, Hopkinton, MA (US)

(72) Inventors: Xiongfang Nie, Beijing (CN); Derek Quanhong Wang, Beijing (CN); Xiaoqiang Zhou, Beijing (CN)

(73) Assignee: EMP IP Holding Company LLC, Hopkinton, MA (US)

(*) Notice: Subject to any disclaimer, the term of this patent is extended or adjusted under 35 U.S.C. 154(b) by 30 days.

(21) Appl. No.: 15/465,588

(22) Filed: Mar. 21, 2017

(65) Prior Publication Data
US 2017/0270035 A1    Sep. 21, 2017

(30) Foreign Application Priority Data
Mar. 21, 2016    (CN) .......................... 2016 1 0162636

(51) Int. Cl.
*G06F 9/44*    (2018.01)
*G06F 11/36*    (2006.01)

(52) U.S. Cl.
CPC ...... *G06F 11/3684* (2013.01); *G06F 11/3664* (2013.01); *G06F 11/3676* (2013.01); *G06F 11/3688* (2013.01)

(58) Field of Classification Search
CPC .......................................... G06F 11/34–3696
See application file for complete search history.

(56) References Cited

U.S. PATENT DOCUMENTS

| 6,577,982 | B1 * | 6/2003 | Erb | ...................... | G06F 11/3684 |
| | | | | | 702/120 |
| 7,865,780 | B2 * | 1/2011 | Dipper | ................ | G06F 11/3684 |
| | | | | | 714/38.1 |

(Continued)

FOREIGN PATENT DOCUMENTS

| CN | 103544109 A | 1/2014 |
| CN | 104461908 A | 3/2015 |

OTHER PUBLICATIONS

Kacker, Raghu N., Eric S. Lagergren, and James J. Filliben. "Taguchi's Orthogonal Arrays Are Classical Designs of Experiments." Oct. 1991. Journal of Research of the National Institute of Standards and Technology vol. 96, pp. 577-591. (Year: 1991).*

(Continued)

*Primary Examiner* — Hiren P Patel
(74) *Attorney, Agent, or Firm* — Brian J. Colandreo; Mark H. Whittenberger; Holland & Knight LLP

(57) ABSTRACT

A method, device, and computer program product for testing code. The method includes identifying a plurality of test points in the code and a plurality of test values to be assigned to the plurality of test points. At least one of the plurality of test points is to be assigned with two or more test values. The method also includes comparing a target test case with a set of test cases. The target test case and the set of test cases are associated with the plurality of test points. The method further includes, in response to determining that each of combinations of the test values assigned to at least two of the plurality of test points in the target test case is present in the set of test cases, excluding the target test case from the set of test cases.

13 Claims, 4 Drawing Sheets

(56) References Cited

U.S. PATENT DOCUMENTS

| | | | | |
|---|---|---|---|---|
| 8,276,123 | B1* | 9/2012 | Deng | G06F 11/3688 714/37 |
| 8,756,460 | B2* | 6/2014 | Blue | G06F 11/3676 714/38.1 |
| 8,842,125 | B2* | 9/2014 | Williams | G06T 1/00 345/501 |
| 9,218,271 | B2* | 12/2015 | Segall | G06F 11/3676 |
| 9,442,830 | B1* | 9/2016 | Zhang | G06F 11/3688 |
| 9,483,385 | B2* | 11/2016 | Mizuno | G06F 11/3684 |
| 9,514,036 | B1* | 12/2016 | Dusanapudi | G06F 16/23 |
| 10,127,143 | B2* | 11/2018 | Hamilton, II | G06F 11/3684 |
| 10,282,281 | B2* | 5/2019 | Mallya | G06F 11/3676 |
| 2005/0204201 | A1* | 9/2005 | Meenakshisundaram | G06F 11/3664 714/38.1 |
| 2008/0263526 | A1* | 10/2008 | Urra | G06F 11/3684 717/136 |
| 2009/0094486 | A1* | 4/2009 | Dipper | G06F 11/3684 714/38.14 |
| 2009/0265694 | A1* | 10/2009 | Bakowski | G06F 11/3676 717/131 |
| 2012/0030658 | A1* | 2/2012 | Hu | G06F 11/3688 717/131 |
| 2012/0173931 | A1* | 7/2012 | Kube | G05B 23/0256 714/37 |
| 2012/0226465 | A1* | 9/2012 | Mizuno | G06F 11/3684 702/123 |
| 2012/0260132 | A1* | 10/2012 | Blue | G06F 11/3676 714/38.1 |
| 2013/0074043 | A1* | 3/2013 | Fu | G06F 11/3664 717/125 |
| 2013/0085741 | A1* | 4/2013 | Segall | G06F 11/3676 703/21 |
| 2013/0106880 | A1* | 5/2013 | Williams | G06T 1/00 345/522 |
| 2016/0055079 | A1* | 2/2016 | Hanna | G06F 11/3692 717/135 |
| 2016/0224462 | A1* | 8/2016 | Yang | G06F 11/3684 |
| 2016/0291970 | A1* | 10/2016 | Mallisetty | G06F 8/71 |
| 2016/0350207 | A1* | 12/2016 | Cmielowski | G06F 11/3688 |
| 2017/0192880 | A1* | 7/2017 | Ramakrishnan | G06F 11/3672 |

OTHER PUBLICATIONS

Grindal, Mats, Jeff Offutt, Sten F. Andler. "Combination Testing Strategies: A Survey." Nov. 2004. pp. 1-34. Retrived by the Examiner from https://cs.gmu.edu/~offutt/rsrch/papers/combstrat-survey.pdf on Aug. 16, 2018. (Year: 2004).*

Pringsulaka et al.; "Coverall Algorithm for Test Case Reduction"; IEEE (Pringsulaka-Dec2005.pdf; pp. 1-8) (Year: 2005).*

Ip.com; "A method of dynamically manage test cases as an ecosystem based on test points and digraph", Jun. 11, 2014; (IPCOM00237273D-Jun2014.pdf; pp. 1-13) (Year: 2014).*

Second Office Action issued in CN Application Serial No. 2016101626365 dated Apr. 11, 2019.

Third Office Action issued in CN Application Serial No. 2016101626365 dated Nov. 13, 2019 with attached English Translation.

* cited by examiner

METHOD, DEVICE, AND COMPUTER PROGRAM PRODUCT FOR TESTING CODE

CROSS-REFERENCE TO RELATED APPLICATIONS

This application claim priority from Chinese Patent Application Number CN201610162636.5, filed on Mar. 21, 2016 at the State Intellectual Property Office, China, titled "METHOD, DEVICE, AND COMPUTER PROGRAM PRODUCT FOR TESTING CODE" the contents of which is herein incorporated by reference in its entirety.

FIELD

Embodiments of the present disclosure relate to the field of software testing and more particularly, to a method, device, and computer program product for testing code.

BACKGROUND

Software testing refers to executing code of a software product in preset conditions to evaluate whether the executing result is obtained as expected. A software tester can simulate specific executing conditions by designing test cases, and then test the software product with the test cases. A test case may be associated with a plurality of test points in the code of the software product (for example, variables included in the code). At least one of a plurality of test points in respective different test case can be assigned with different test values.

As software becomes constantly larger and increasingly complex, more and more test points need to be considered in testing a software product, which means that the amount of test cases for the software product also increases exponentially. This exacerbates the complexity of software testing. However, the traditional solution cannot achieve a satisfactory balance between test coverage and testing efficiency.

SUMMARY

Embodiments of the present disclosure provide a solution for testing code of a software product.

In a first aspect of the present disclosure, there is provided a method of testing code. The method includes identifying a plurality of test points in the code and a plurality of test values to be assigned to the plurality of test points. At least one of the plurality of test points is to be assigned with two or more test values. The method also includes comparing a target test case with a set of test cases. The target test case and the set of test cases are associated with the plurality of test points. The method further includes, in response to determining that each of combinations of the test values assigned to at least two of the plurality of test points in the target test case is present in the set of test cases, excluding the target test case from the set of test cases. Embodiments in this regard further provide a corresponding computer program product.

In a second aspect of the present disclosure, there is provided a device for testing code. The device includes at least one processing unit. The at least one processing unit is configured to identify a plurality of test points in the code and a plurality of test values to be assigned to the plurality of test points. At least one of the plurality of test points is to be assigned with two or more test values. The at least one processing unit is further configured to compare a target test case with a set of test cases. The target test case and the set of test cases are associated with the plurality of test points. The at least one processing unit is further configured to, in response to determining that each of combinations of the test values assigned to at least two of the plurality of test points in the target test case is present in the set of test cases, exclude the target test case from the set of test cases.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features and advantages of example embodiments disclosed herein will become apparent through the following detailed description with reference to the accompanying drawings. In embodiments of the present disclosure, the same or similar reference symbols refer to the same or similar elements.

DETAILED DESCRIPTION

Figure 1:
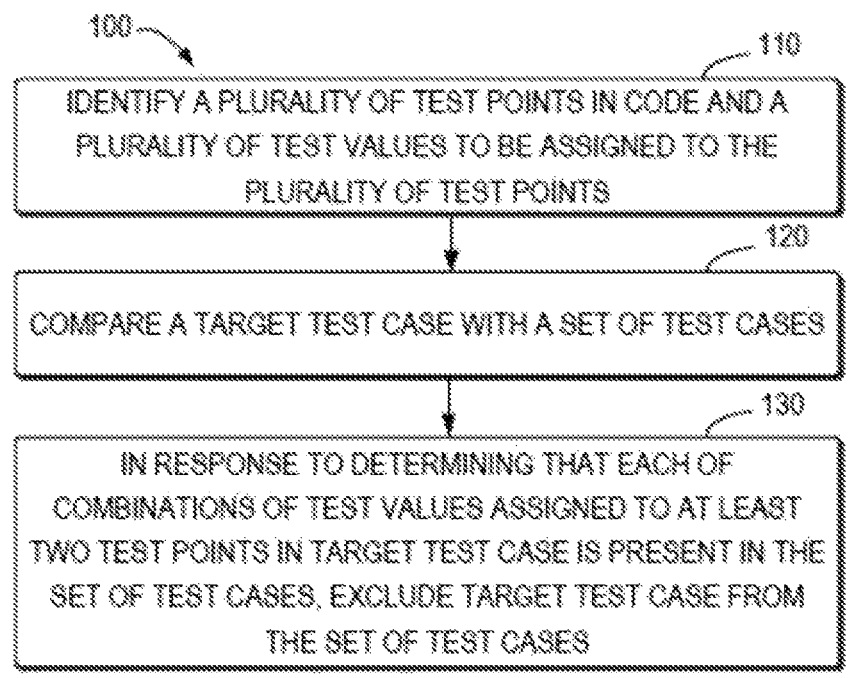
FIG. 1 illustrates a flowchart of a process of testing code in accordance with an embodiment of the present disclosure.

Principles of example embodiments disclosed herein will now be described with reference to various example embodiments illustrated in the drawings. It should be appreciated that depiction of those embodiments is only to enable those skilled in the art to better understand and further implement example embodiments disclosed herein and is not intended for limiting the scope disclosed herein in any manner.

Conventional software test processes may involve works in various aspects as below:

(1) A software tester identifies test points in code of a software product and test values corresponding to the test points according to the utilization and function specification of the software product and possibly with assistance of the software development team.

(2) A software tester designs a plurality of test cases to reiterate all the test values for the test points. Generally, the software tester may design one or more test cases for a specific test point each time so as to cover all the test values for this test point. Among these test cases, other test points may be assigned with fixed test values.

(3) The set of test cases designed for all the test points can be provided to a test system for testing code of the software product. This test process can be automatically performed on the test system. The code may be executed once according to each of the test cases to determine whether an executing result is generated as expected.

(4) Upon finishing the test process, code coverage is calculated to determine whether the test process is sufficient.

The code coverage is used for measuring the number of code lines being executed in the software product during this test process.

(5) After a step of integration, all the test cases are fixed, and the software testing is into a maintenance mode. Then, except some test cases obtained based on determined code bugs, no new test cases can be added. Therefore, when this product is needed to be tested again, only these existing test cases can be used.

The inventors have found upon studies that the above software test process has the following problems and drawbacks:

(1) Due to the limit of a software tester in designing test cases, a plurality of test cases may involve the same test operation in the testing of the code. For example, in a plurality of test cases designed for a specific test point, if only the test value for this test point changes while other test points are always assigned with the same test values, then the same combinations of test points among these test points will always be executed repeatedly. This may cause too many time and processing resources wasted on testing of the same operation, thereby reducing the testing efficiency. In addition, the software tester usually designs all possible test cases in one time and integrates the test cases into the test system. Each time it is expected to test the code of the software, the same test cases are always repeatedly tested. This cannot achieve effective testing.

(2) Although code coverage is a common metric for determining and measuring test coverage (test performance), in test scenarios such as software performance test and system test, what needs more concern than the code coverage is an interaction coverage involving different inputs of the software product. Such input interaction can be represented by a combination of different test values for the test points in different test cases. However, the code coverage cannot measure coverage of interactions of these inputs. Since there are no metric for measurement, the software tester can hardly consider these different input interactions when designing test cases and it is difficult to continue improving the test cases later. Therefore, it may be impossible to detect potential problems in the code.

(3) The number of software test cases needed to be designed can increase exponentially with an increase of test points and the number of corresponding test values. For example, it is supposed that there are P test points and the number of test values for the $i^{th}$ test point is $V_i$. During the conventional test process, in order to cover all possible test values, $\Sigma_{i=1}^{P} V_i$ test cases are needed to be designed. This may not only increase the workload of the tester but also consume considerable time and resources.

(4) During the conventional software test, all test cases are put into a pool of regression test case after being integrated and then no new test cases can be added thereafter. This results in an almost static test coverage in subsequent testing of the code (for example, when a re-test is needed in the maintenance mode) which cannot be further improved.

(5) Compared with a full round of test (that is, a test based on all test cases), it is may be desirable to execute a subset of these test cases more frequently (due to the limitation in time and processing resources). A frequently executed subset of test cases is usually selected based on expert recommendations. However, such selection of test cases, which seriously depends on expertise, cannot guarantee that the test coverage in each round of test can be maximized. Moreover, other test cases than the recommended test cases usually have to wait for a full round of test (which is rarely executed) before being executed. This also results in a fact that the test coverage of the frequently executed test round is not improved from a long-term perspective.

In view of one or some problems of the above problems and other potential problems, embodiments of the present disclosure provide a solution for software testing. In the solution, various combinations of test values for different test points are considered when determining a set of test cases for testing code, such that higher test coverage related to the input interaction can be achieved with fewer test cases.

FIG. 1 shows a flowchart of a process 100 for testing code in accordance with an embodiment of the present disclosure. The process 100 may be implemented in a test system. It would be appreciated that the process 100 can also include additional steps and/or some steps can be omitted. In addition, the order of steps is not limited to that illustrated in FIG. 1. Any other possible order (including parallel execution) is included within the scope of the present disclosure.

At step 110, a plurality of test points in code of a software product and a plurality of test values to be assigned to a plurality of test points are identified. The term "test point" used herein refers to a variable or statement defined in the code that can be assigned with a value. A test value refers to a value that can be assigned to a corresponding test point. In some embodiments, the test points and corresponding test values can be determined by a user (for example, a software tester) based on a test scenario, usage, and function specification of the code, and/or with assistance of a software developer, and inputted into the test system. Alternatively, or in addition, the code can also be automatically analyzed by the test system to provide recommendations for test points and test values to be used in testing. The user may identify the test points and test values to the system by selecting and confirming these recommendations.

At least one test point among the identified plurality of test points can be assigned with two or more test values. In other words, the number of test values is greater than the number of test cases. Therefore, a plurality of test cases are needed to be generated based on these test points and test values. In some embodiments, a plurality of test points, a plurality of test values, and the correspondence there between may be stored for subsequent use. For example, a plurality of test points and corresponding test values may be stored in a form of table. Of course, the storage may also be performed in other ways, as long as the correspondence between the test points and the test values can be identified. It is supposed that four test points A, B, C, and D are identified from the code and each of the test points has three different test values (it is only for the purpose of convenience; actually, the number of test values for each test point may be different). The correspondence between these test points and test values may be shown in Table 1.

TABLE 1

A correspondence table of test point-test value

| Combination of test values | Test point/Test value | | | |
| --- | --- | --- | --- | --- |
| | A | B | C | D |
| Test value combination 1 | A1 | B1 | C1 | D1 |
| Test value combination 2 | A2 | B2 | C2 | D2 |
| Test value combination 3 | A3 | B3 | C3 | D3 |

Next, at step 120, a target test case is compared with a set of test cases. In an embodiment of the present disclosure, in order to obtain a set of test cases for testing code, it may be determined whether a certain test case (a target test case) can be included into the set of test cases. Comparison between the target test case and the set of test cases will be described in detail below.

In embodiments of the present disclosure, the target test case and test cases in the set of test cases are all associated with the plurality of test points. In different test cases, at least one of the plurality of test points may be assigned with different test values. It is supposed that P test points are identified from the code and the $i^{th}$ test point has $V_i$ test values, then a test case may be expressed as:

$$TC=\{(TP_i,TV_j):1<=i<=P,1<=j<=V_i\} \quad (1)$$

where TC represents a test case, $TP_i$ represents a test point in the test case and i ranges from 1 to P, and $TV_j$ represents a test value corresponding to the test point $TP_i$ in the test case which is the $j^{th}$ test value from the $V_i$ test values for the test point. For example, according to the test points and test values in the example of Table 1 above, a test case may be represented as TC={A1, B2, C1, D1}, where the test point A is assigned with its first test value A1, test point B is assigned with its second test value B2, and so on.

In some embodiments, the set of test cases may already include a plurality of test cases. These test cases may be those manually designed by a software tester in a conventional manner. In these situations, the target test case may be a test cases retrieved from the set of test cases.

In some other embodiments, a test case may also be automatically generated based on the identified test points and test values. Specifically, a target test case may be generated by randomly assigning test values from the plurality of test points to the plurality of test points. In some embodiments, when generating a test case, constraints on combining some of the test values are also taken into account. For example, some constraints may indicate that some test values for some test points have to concurrently exist in one test case or cannot concurrently exist in one test case, and the like. In an embodiment where a new test case is generated, the set of test cases may first include no test case and is constantly expanded by generating one target test case automatically and determining whether the generated test case can be put into the set of test cases.

In some embodiments, the comparison between the target test case and the set of test cases at step 120 may be a comparison between a combination(s) of test values for test points in the target test case and a combination(s) of test values in the set of test cases. In some embodiments, there may be a plurality of types of combinations of test values. Combinations of test values for a different number of test points may be referred to as a different type of combinations. For example, for a test case TC={A1, B2, C1, D1}, the following combinations can be considered: various combinations of test values for every two test points (for example, (A1, B2), (A1, C1), (A1, D1), (B2, C1), and (C1, D1)), various combinations of test values for every three test points ((A1, B2, C1), (A1, C1, D1), (A1, B2, D1), and (A1, C1, D1)), or combinations of test values for more test points. Different combinations of test values for test points may reflect different possible user interaction scenarios in actual use of the software product.

As used herein, combinations of test values corresponding to t test points may be referred to as t-order combinations, where t may be larger than 1 and smaller than the total number of test points. For the given plurality of test points and test values, the number of their t-order combinations is fixed. It is generally desired that the test cases for testing code can cover all t-order combinations or at least cover 2-order combinations as much as possible.

For example, it is supposed that P test points are identified in the code and the $i^{th}$ test point has $V_i$ test values. The total number of the t-order combinations of these test points and test values may be calculated through the following equation:

$$C_t(1, \ldots, P) = \sum_{j=1}^{P-t+1} (V_j C_{t-1}(j+1, \ldots, P)) \quad (2)$$

where $C_t(1, \ldots, P)$ indicates the total number of the t-order combinations: $V_j$ indicates the number of test values for the $j^{th}$ test point, and where $$C_0(j, \ldots, P) = C_0 = 1 (1 \leq j \leq P+1) \quad (3)$$

For example, for the 4 test points and 3 test values for each test point as illustrated in above Table 1, the total number of 2-order combinations may be determined based on Equations (2) and (3) above as:

$$C_2(1, \ldots, 4) = \sum_{j=1}^{4-2+1} (V_j C_{2-1}(j+1, \ldots, 4)) = 54 \quad (4)$$

In embodiments of the present disclosure, it is desired that combinations of test values for test points in the set of test cases can cover more combinations in different orders. Therefore, at step 103, in response to determining that each of combinations of test values assigned to at least two of the plurality of test points in the target test case is present in the set of test cases, the target test case is excluded from the set of test cases. In other words, whether the target test case can be included in the set of test cases depends on whether the target test case can increase the number of different combinations of test values present in the set of test cases. If all of the combinations for the target test case are present in the set of test cases, it means that the target test case cannot help add any new combination to the set of test cases, and thus the target test case may be excluded from the set of test cases.

It is supposed that for the 4 test points and 3 test values for each point as illustrated in above Table 1, the set of test cases has already 7 test cases as illustrated in Table 2 below.

TABLE 2

The set of test cases

| | Test point/Test value | | | |
|---|---|---|---|---|
| Test case | A | B | C | D |
| 1 | A1 | B1 | C1 | D1 |
| 2 | A1 | B2 | C2 | D2 |
| 3 | A2 | B1 | C2 | D3 |
| 4 | A2 | B3 | C1 | D2 |
| 5 | A3 | B1 | C3 | D2 |
| 6 | A3 | B3 | C2 | D1 |
| 7 | A1 | B1 | C2 | D2 |

2-order combinations present in this set of test cases shown in Table 2 are illustrated in Table 3 below:

TABLE 3

2-order combinations of set of test cases of Table 2

| Test case | 2-order combination | | | | | |
|---|---|---|---|---|---|---|
| | 1 | 2 | 3 | 4 | 5 | 6 |
| 1 | A1, B1 | A1, C1 | A1, D1 | B1, C1 | B1, D1 | C1, D1 |
| 2 | A1, B2 | A1, C2 | A1, D2 | B2, C2 | B2, D2 | C2, D2 |
| 3 | A2, B1 | A2, C2 | A2, D3 | B1, C2 | B1, D3 | C2, D3 |
| 4 | A2, B3 | A2, C1 | A2, D2 | B3, C1 | B3, D2 | C1, D2 |
| 5 | A3, B1 | A3, C3 | A3, D2 | B1, C3 | B1, D2 | C3, D2 |
| 6 | A3, B3 | A3, C2 | A3, D1 | B3, C2 | B3, D1 | C2, D1 |
| 7 | A1, B1 | A1, C2 | A1, D2 | B1, C2 | B1, D2 | C2, D2 |

It is supposed that it is needed to determine whether the target test case 7 in Table 2 can be included in or excluded from the set of test cases. Then it is determined whether all of the 2-order combinations for the test case 7 are included in combinations for the set of test cases formed by the remaining 6 test cases. It can be seen from Table 3 that each of the 2-order combinations ((A1, B1), (A1, C2), (A1, D2), (B1, C2), (B1, D2), (C2, D2)) for the test case 7 are all included in the combinations for the set of the previous 6 test cases. Therefore, it can be determined that the test case 7 is excluded from the set of test cases.

An example of determining whether to exclude the target test case based on 2-order combinations has been described above. In some embodiments, higher-order combinations may also be additionally or alternatively used to determine whether to exclude the target test case. For example, it can be determined whether all of the 3-order combinations for the test case 7 are present in the 3-order combinations for the set of test cases. In some embodiments, the user may set which type(s) of combinations for the target test case and the set of test cases are to be compared. In other words, one or more orders of t can be set by the user. In some embodiments, the order t may be default, for example, be set to 2.

Generally, if at least one low-order combination (for example, 2-order combinations) for the target test case is not present in the set of test cases, it can be directly determined that at least one of its high-order combinations (for example, 3-order combinations) will not present in the set of test cases. However, if all of the low-order combinations for the target test are present in the set of test cases, it may be further determined whether each of its high-order combinations (for example, 3 or higher-order combinations) is present in the set of test cases if necessary. In some embodiments, if all of the low-order combinations are present in the set of test cases, but at least one high-order combination is not present in the set, the target test case may not be excluded from the set of test cases. For example, for the test case 7 in Table 2 above, although all of its 2-order combinations are present in the set of the remaining 6 test cases (as illustrated in Table 3), at least one of its 3-order combinations (A1, B1, C2) is not present in the set of test cases. Thus, the test case 7 can be maintained in the set of test cases.

In some embodiments, as mentioned above, the set of test cases for comparison may include one or more test cases that have been designed by the user or may be a null set. When one or more test cases are included in the set, a target test case can be retrieved from the set one by one and is used to compare with the remaining set of test cases to determine whether this target test case can be removed. For example, if all t-order (for example, 2-or-higher order) combinations of the target test case are present in the set of test cases, the target test case can be removed from the set of test cases.

If the set of test cases is a null set and test cases can be automatically generated, the first test case may be compared with a null set of the t-order combinations and thus can be directly added into the set of test cases. The t-order combinations of the test values for the test points of the subsequently generated target test case may be already present in the set of test cases, and thus the new generated target case may not be added to the set of test cases.

In some embodiments, if it is determined that the t-order combinations of the test values for the test points of the target test case may already be present in the set of test cases, this test case may be indicated to the user (for example, a software tester) for confirmation. Then, in response to the confirmation from the user, the target test case can be excluded from the set of test cases.

In some embodiments, if it is determined that at least one of the combinations of test values assigned to at least two of the plurality of test points in the target test case is different from each of combinations of test values for at least two test points in the set of test cases, the target test case may be added into the set of test cases. For example, if the target test case is TC={A1, B3, C2, D2}, it may be determined that a combination of test values for test points A and B in the target test case is (A1, B3), and as can be seen from the set of 2-order combinations for the test cases 1-6 in Table 3, the combination (A1, B3) of the test values for the test points A and B is different from any combination of the test values for these test points in the set of test cases. Therefore, the target test case TC={A1, B3, C2, D2} may be added into the set of test cases of Table 2, for example, as the test case 7 in the set.

In some embodiments, in the case where it is determined that the target test case can add a new combination to the set of test cases, whether the target test case can also be added into the text case set is determined based on selection of the target test case by the user. For example, the target test case may be recommended to the user for selection, and in response to the user section, this test case is added to the set of test cases.

Alternatively, or in addition, whether to add the target test case into the set of test cases may also be determined based on the number of different combinations of test values or the number of test cases that have been included in the set of test cases. In some embodiments, a target number of combinations (for example, a target of 2 or higher-order combinations) or a target number of test cases may be set. If the number of different combinations or the number of test cases in the set of test cases has not reached the corresponding target, then the target test case can be added into this set. Usually, the target number of test cases or the target number of combinations of the test values may be restrained based on a predetermined test target, the execution capability of the test system, the processing resource for each round of test, or the predetermined executing time.

Through the process 100, the set of test cases may be obtained to cover more possible combinations. In some embodiments, the set of test cases may be used to test code, and the number of different combinations of test values included in the set of test cases may be used as a metric for measuring the performance of the present round of test. Specifically, a number of different combinations of the test values included in the set of test cases may be compared with a total number of different combinations of the plurality of test values for the plurality of test points to calculate the test coverage. In some embodiments, the test coverage may be measured based on a predetermined order of combinations. For example, the test coverage may be measured based on the 2-order combinations of test values for every two test points. In some other embodiments, various types of test coverage may be determined based on combinations of a plurality of different orders. As used herein, the test coverage of the code determined based on combinations of test values can be referred to as test coverage or combination coverage. In some embodiments, 2-order or higher-order combinations for the set of test cases (for example, the combinations listed in Table 3 above) may be saved for subsequent calculation of the test coverage.

For example, in the example of Table 2 above, according to the process 100, the test case 7 may be excluded from the set of test cases in Table 2 while the remaining 6 test cases are maintained. Then, the 6 test cases may be used to test code. It may be seen from the 2-order combinations of the 6 test cases listed in Table 3 that the 6 test cases include 36 different 2-order combinations. According to Equation (4), it is determined that the 4 test points and their corresponding test values in the example of Table 1 have totally 54 different 2-order combinations. Therefore, when the 6 test cases are used to test code, the 2-order test coverage of this test may be $36/54=2/3$. Of course, the 3 or higher-order test coverage may also be correspondingly determined.

Accordingly, for an existing set of test cases (for example, the set of test cases designed by a software tester), test cases with redundant t-order combinations may be excluded from the set through the process 100, such that the same combined test coverage can be obtained with fewer test cases.

Alternatively, in the case where the test cases can be automatically generated, a set of test cases can be generated to provide large test coverage (for example, about 70%, 90%, or 100% of 2-order test coverage). For example, in the example of Table 2 above, if the test cases 1-6 have been generated and it is determined that the test case 7 cannot be added into the set, a new test case may be further generated so as to cover more 2-order combinations. In one example, the following three test cases may be further generated, and added to the set of test cases, thereby achieving 100% of 2-order test coverage.

TABLE 4

New added test case

| Test case | Test point/Test value | | | |
|---|---|---|---|---|
| | A | B | C | D |
| 7 | A1 | B3 | C3 | D3 |
| 8 | A2 | B2 | C3 | D1 |
| 9 | A3 | B2 | C1 | D3 |

In the example of Table 4, combinations of test values for each of the generated test cases 7-9 may be compared with the combinations present in the set of test cases to determine whether it can add any new combination (for example, 2-order combination) in the set. If it is determined that a test case can add at least one new combination in the set of test cases, this test case can be added into the set of test cases.

It would be appreciated that the set of test cases formed by test cases in Table 2 (with the test case 7 removed) in combination with test cases in Table 4 can cover 4 test points (A, B, C and D) and all of the 54 2-order combinations of corresponding three test values. However, during an actual process of generating test cases, it may be difficult to determine the exact three test cases illustrated in Table 4 to compensate for the lack of combinations in the set of test cases, especially when the numbers of the identified test points and test values are great. Therefore, in order to achieve a target number of combinations or target test coverage, actually more test cases may need to be generated.

As mentioned above, due to limitation of processing resources, the number of test cases that can be executed for each round of code testing may be limited. Therefore, a target number of combinations or target test coverage or the number of test cases may be set to restrict generation of the set of test cases. In other words, the number of test cases included in each set of test cases may be limited. In some cases, even the coverage of the 2-order combinations in the obtained set of test cases is relatively high, for example, as high as 100%, the coverage of higher-order combinations (for example, 3-order combinations or 4-order combinations) in the set of test cases may not reach the desired level.

In another aspect, for a given test point and its test values, there may be a larger number of different test cases. For example, it is supposed that there are P test points and the number of test values for each test point is V (only for the purpose of convenience; actually, the numbers of test values for respective test points may be different). Then there may be at most $V^P$ different test cases (without considering mutual constraints between test values). Each set of test cases cannot cover all of these test cases.

In order to further improve the coverage of respective orders of combinations and to test as many different test cases as possible, in some embodiments, during the process 100, if it is determined that each of combinations of test values assigned to at least two of the plurality of test points in the target test case is present in the set of test cases, the target test case may be compared with another set of test cases. If it is determined that at least one combination of the test values assigned to the at least two of the plurality of test points in the target test case is different from each of combinations of the test values for at least two of the test points in another set of test cases, the target test case may be added into the other set of test cases. In other words, if the generated target test case cannot be added into the current test set, it may be further used in one or more other sets of test cases.

As mentioned above, the target test case is generated by randomly assigning test values to the test points. In this way, if a set of test cases cannot achieve higher test coverage or cannot include more test cases, the code can be tested based on other test case set(s). In some embodiments, when there are a plurality of sets of test cases, one, some, or all sets of test cases may be randomly selected from the plurality of sets of test cases. From the long-term perspective, using a plurality of sets of test cases can improve the test coverage at respective orders and cover more different test cases.

In some embodiments, in a scenario where frequent and quick code testing is needed, one or some, rather than all, sets of test cases may be randomly selected from the plurality of set of test cases and used to test code. Since test cases in a set of test cases can obtain large combination test coverage through the process of generating the set of test cases, even if only a part of test cases in all sets of test cases is executed each time, high test coverage can still be achieved. This can ensure the high efficiency in each round of test compared with the traditional manner of relying on manual selection of a part of test cases.

Code testing based on a set of test cases has been described above with reference to some example embodiments. In order to further facilitate code testing, in some embodiments of the present disclosure, an interface function for a test point may be leveraged to test the code. Specifically, if the identified test points are determined, a plurality of interface functions corresponding to the test points may be generated based on the test points. If a set of test cases is selected for use, the test values for the plurality of test points in the respective test cases included therein may be used as inputs of the plurality of interface functions. Then, when executing the code, the code can be executed by invoking these interface functions so as to obtain a result of code executing. During a traditional code test process, an executable script for each test case may need to be complied by the software tester or generated in an automatic manner for code testing. As such, if there are too many test cases, this test process may be time-consuming. However, by designing interface functions, different test cases may be conveniently processed without consuming considerable time for scripting the test cases.

In some embodiments, defects of code can be found through the test process. Specifically, each test case may be corresponding to an expected result. If a result of executing the code using the test case is inconsistent with the expected result, it means that the test case corresponds to a defect. In this case, the test case corresponding to the defect may be recorded and notified to the user. The user may determine that the code should be revised based on the reported test case. In some cases, code revision may result in one or more new test points and new test values to be assigned to these test points, or may result in new test values for the existing test points. In these cases, a further target test case may be generated according to the process 100, and it is further determined whether this test case can be included in the set of test cases.

Different from the traditional test process, which can only add a known single test case into the set of test cases, through the process 100, addition of target test case(s) still takes combinations of different test values for different test points (existing test point and new test point) into account so as to obtain more test cases to provide high test coverage. Therefore, new combinations generated based on new test points or test values may be added into the set of test cases, so as to continue the code testing based on the new set of test cases for the next time. Accordingly, the process 100 may not only facilitate high test coverage and effective test at the initial stage of software testing, but also facilitate constant improvement of the coverage and test efficiency during the subsequent stage of product maintenance.

In one example, through the code testing, the user may find out a product defect and determine that a new test point D can also be added in addition to the original test points A, B, and C. Moreover, the test point D has three test values D1, D2, and D3. A corresponding set of test cases may be generated based on the new test point through the process 100, as illustrated in Table 5 below. It can be seen from Table 5 that the set of test cases can take into account various kinds of combinations of test values for the test point D and test values for the previous test points.

TABLE 5

A set of test cases after adding a new test point

| Test case | Test point/Test value | | | |
|---|---|---|---|---|
| | A | B | C | D |
| 1 | A1 | B1 | C1 | D1 |
| 2 | A1 | B2 | C2 | D2 |
| 3 | A1 | B3 | C3 | D3 |
| 4 | A2 | B1 | C2 | D3 |
| 5 | A2 | B2 | C3 | D1 |

TABLE 5-continued

A set of test cases after adding a new test point

| Test case | Test point/Test value | | | |
|---|---|---|---|---|
| | A | B | C | D |
| 6 | A2 | B3 | C1 | D2 |
| 7 | A3 | B1 | C3 | D2 |
| 8 | A3 | B2 | C1 | D3 |
| 9 | A3 | B3 | C2 | D1 |

Figure 2:
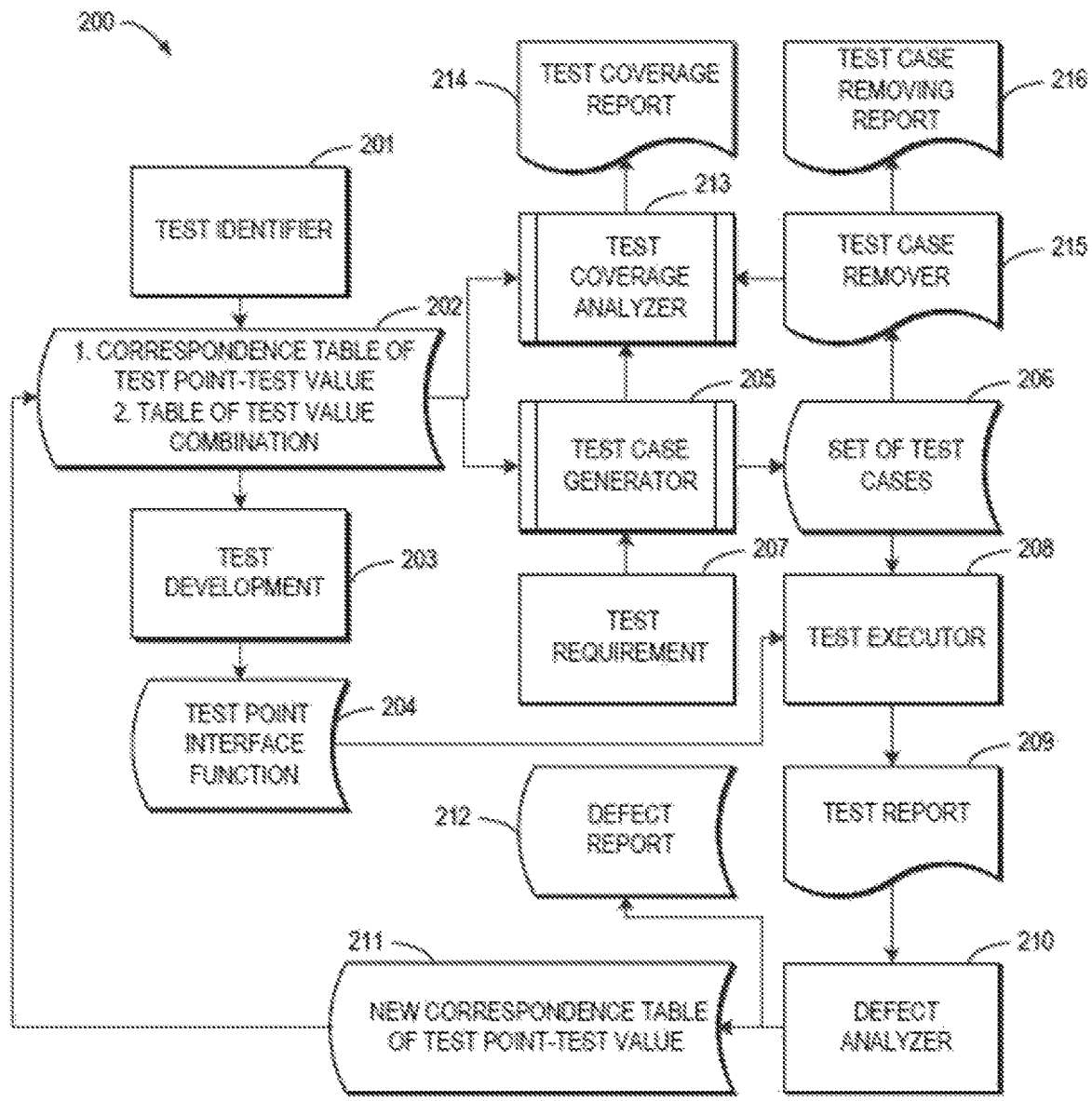
FIG. 2 illustrates a block diagram of a system for testing code in accordance with an embodiment of the present disclosure.

FIG. 2 illustrates a structural block diagram of a system for testing code 200 in accordance with an embodiment of the present disclosure. The system 200 is merely a specific example of a system for implementing a code test process of some embodiments. It would be appreciated that the system 200 may include more or less functional blocks.

As illustrated in FIG. 2, the system 200 includes a test identifier 201 for identifying test points and test values from code to be tested. The identified test points and test values are stored in 202 by formulating a correspondence table between the test points and the test values. In addition, a table of different combinations of the test values for these test points may also be stored in 202. Based on the correspondence table between the test points and test values, a test case generator 205 may generate a test case and put the test case into a set of test cases 206. The test case generator 205 also refers to a test requirement 207 when generating the test case. The test requirement 207 may include constraints on the combinations of test values, for example. As an example, the test requirement 207 may specify that specific test values for some test points should or should not appear in the same test case.

A test case remover 215 may determine whether a certain test case can be removed from the set of test cases. Removal of the test case may be determined based on whether the test case can add any new i-order combination (t may be greater than or equal to 2 but less than the number of the identified test points) into the set of test cases. In some embodiments, it is determined that the test case which is determined to be removed may be stored in a test case removal report 216 so as to be provided to the user.

The obtained set of test cases 206 may be provided to a test executor 208 for testing code. In some embodiments, the identified test points may be provided into a test development 203 to facilitate developing test point interface functions 204 corresponding to these test points. The test executor 208 may invoke these interface functions, and use the test values for the test points executed in the corresponding test case as inputs of these interface functions. By use of these interface functions, the code testing may be quickly executed. A result of the code executing may be stored in a test report 209. In some embodiments, the test report 209 may include a executing result for each test case and an expected result for the test case.

In order to analyze whether defects of code are found in each round of test, the test report 209 may be provided to a defect analyzer 210. The defect analyzer 210 analyzes the test report 209, stores possible defects present in the defect report 212, and provides the defects to the user where required. In some embodiments, if the defect analyzer 210 determines that a new test point(s) and corresponding test value(s) or new test values 211 for existing test points in the code of the product can be further tested, such information may be merged into the correspondence table of test points and test values in 202 so as to facilitate the test case generator 205 to use such information to further generate new test cases.

In some embodiments, a test coverage analyzer 213 may also determine the test coverage for each round of test based on the stored table of test value combinations 202, the test cases generated by the test case generator 205, and the test case(s) removed by the test case remover 215. The test coverage analyzer 213 may also generate a test coverage report 214 to be provided to the user.

In the above embodiments, the system 200 is described as executing a test process based on automatically generated test cases. In other embodiments, the already designed test cases may also be combined to the system 200. The system 200 may perform the code test process based on the existing test cases. For example, the existing test cases may be added to the set of test cases 206. In this case, the respective functional blocks of the system 200 may continue performing the operations as above.

Figure 3:
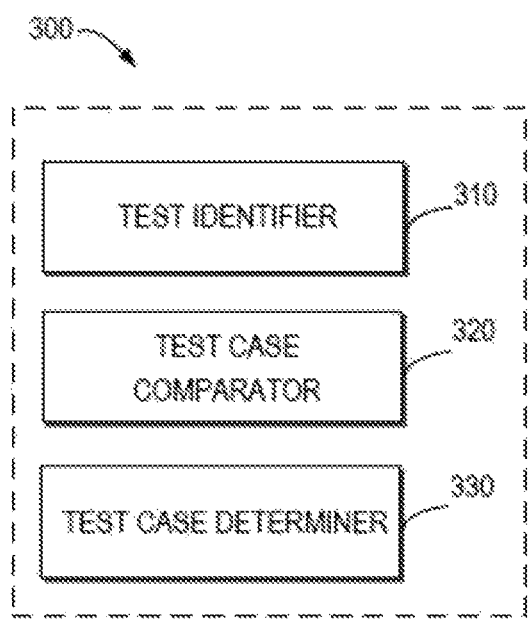
FIG. 3 illustrates a structural block diagram of an apparatus for testing code in accordance with an embodiment of the present disclosure.

FIG. 3 illustrates a structural block diagram of an apparatus for testing code 300 in accordance with an embodiment of the present disclosure. As illustrated in FIG. 3, the apparatus 300 includes a test identifier 310 configured to identify a plurality of test points in the code and a plurality of test values to be assigned to the plurality of test points. At least one of the plurality of test points is to be assigned with two or more test values. The device 300 also includes a test case comparator 320 configured to compare a target test case with a set of test cases. The target test case and the set of test cases are associated with the plurality of test points. The apparatus 300 further includes a test case determiner 330 configured to, in response to determining that each of combinations of the test values assigned to at least two of the plurality of test points in the target test case is present in the set of test cases, exclude the target test case from the set of test case.

In some embodiments, the apparatus 300 may further include a test case generator configured to generate the target test case by randomly assigning test values from the plurality of test values to the plurality of test points.

In some embodiments, the target test case is included in the set of test cases. The test case determiner 330 may be configured to remove the target test case from the set of test cases.

In some embodiments, the test case determiner 330 may be further configured to, in response to determining that at least one of combinations of the test values assigned to at least two of the plurality of test points in the target test case is different from each of combinations of the test values for the at least two test points in the set of test cases, add the target test case into the set of test cases.

In some embodiments, the test case determiner 330 may be further configured to add the target test case into the set of test cases based on at least one of: user selection of the target test case, the number of different combinations of the test values present in the set of test cases, or the number of test cases that have been included in the set of test cases.

In some embodiments, the apparatus 300 may further include a code tester configured to test code using the set of test cases, and a coverage determiner configured determine test coverage for the set of test cases by comparing the number of different combinations of the test values included in the set of test cases with a total number of different combinations of the plurality of test values for the plurality of test points.

In some embodiments, the code tester may be further configured to: generate a plurality of interface functions corresponding to the plurality of test points, use the test values for the plurality of test points in respective test cases in the set of test cases as inputs of the plurality of interface functions, and invoke the plurality of interface functions to execute the code.

In some embodiments, the set of test cases is a first set of test cases, and the test case determiner 330 may be further configured to: in response to determining that each of combinations of the test values assigned to at least two of the plurality of test points in the target test case is present in the first set of test cases, compare the target test case with a second set of test cases; in response to determining that at least one of combinations of the test values assigned to at least two of the plurality of test points in the target test case is different from each of combinations of the test values for the at least two test points in the second set of test cases, add the target test case into the second set of test cases; and randomly select at least one test case from the first and second sets of test cases to test the code.

Figure 4:
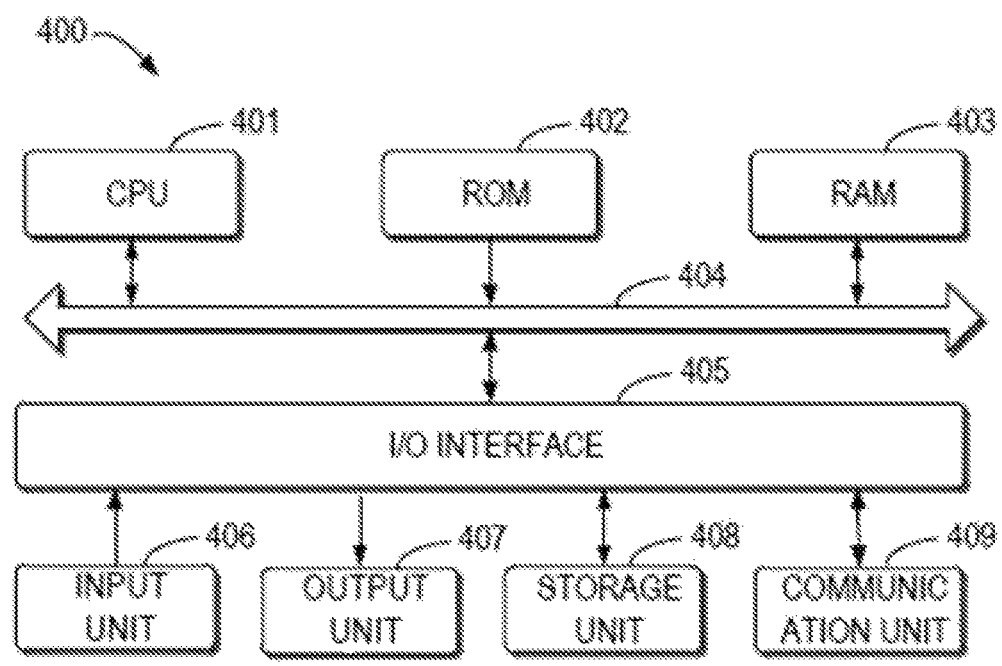
FIG. 4 illustrates a schematic block diagram of an example device suitable for implementing embodiments of the present disclosure.

FIG. 4 illustrates a schematic block diagram of an example device 400 suitable for implementing embodiments of the present disclosure. The device 400 may implement the system for testing code in FIG. 2 and/or implement the apparatus 300 for testing code in FIG. 3. As shown, the device 400 includes a central processing unit (CPU) 401 which is capable of performing various suitable actions and processes in accordance with computer program instructions stored in a read only memory (ROM) 402 or loaded to a random access memory (RAM) 403 from a storage unit 408. In the RAM 403, various programs and data required for operation of the device 400 may also be stored. The CPU 401, ROM 402, and RAM 403 are connected to one another via a bus 404. An input/output (I/O) interface 405 is also connected to the bus 404.

Various components in the device 400 are connected to the I/O interface 405, including an input unit 406 such as a keyboard, a mouse, and the like; an output unit 407 such as various kinds of displays, loudspeakers, and the like; the storage unit 408 such as a magnetic disk, an optical disk, and the like; and a communication unit 409 such as a network card, a modem, and a radio communication transceiver, and the like. The communication unit 409 enables the device 400 to communicate information/data with other devices via a computer network such as Internet and/or various telecommunication networks.

Various methods and processing described above, such as the process 100, may be implemented with the processing unit 401. For example, in some embodiments, the process 100 may be implemented as a computer software program which is tangibly included in a machine-readable medium such as the storage unit 408. In some embodiments, part or all of the computer program may be loaded and/or installed on the device 400 via the ROM 402 and/or communication unit 409. When the computer program is loaded to the RAM 403 and executed by the CPU 401, one or more steps of the process 100 described above may be performed.

Those skilled in the art would understand that various steps of the method of the disclosure above may be implemented via a general purpose computing device, which may be integrated on a single computing device or distributed over a network composed of a plurality of computing devices. Optionally, they may be implemented using program code executable by the computing device, such that they may be stored in a storage device and executed by the computing device; or they may be made into respective integrated circuit modules or a plurality of modules or steps therein may be made into a single integrated circuit module for implementation. In this way, the present disclosure is not limited to a combination of any specific hardware and software.

It would be appreciated that although several means or sub-means of the apparatus have been mentioned in detailed description above, such partition is only example but not limitation. Actually, according to the embodiments of the present disclosure, features and functions of two or more apparatuses described above may be instantiated in one apparatus. In turn, features and functions of one apparatus described above may be further partitioned to be instantiated by a plurality of apparatuses.

What have been mentioned above are only optional embodiments of the present disclosure and are not limiting the present disclosure. For those skilled in the art, the present disclosure may have various alternations and changes. Any modifications, equivalents and improvements made within the spirits and principles of the present disclosure should be included within the scope of the present disclosure.

We claim:

1. A method of testing code, comprising:
identifying, via a processor, a plurality of test points in the code and a plurality of test values to be assigned to the plurality of test points, at least one of the plurality of test points to be assigned with two or more test values;
comparing a target test case with a set of test cases, the target test case and the set of test cases being associated with the plurality of test points to determine whether the target test case increases a number of different combinations of the plurality of test values present in the set of test cases;
in response to determining that each of combinations of the test values assigned to at least two of the plurality of test points in the target test case is present in the set of test cases indicating the target test case does not increase the number of different combinations of the plurality of test values present in the set of test cases, excluding the target test case from the set of test cases;
in response to determining that at least one of combinations of the test values assigned to at least two of the plurality of test points in the target test case is different from each of combinations of the test values for the at least two test points in the set of test cases, adding the target test case into the set of test cases based on a number of test cases included in the set of test cases;
executing the code using the set of test cases to generate one or more results;
generating a notification indicating that at least one test case of the set of test cases corresponds to a defect in response to at least one result of the one or more results being inconsistent with an expected result;
in response to generating a notification indicating that at least one test case of the set of test cases corresponds to a defect, identifying and assigning at least one new test point associated with the defect;
determining whether further testing for the at least one new test point and at least one corresponding test value is needed; and
generating a new set of test cases based on the at least one new test point and one or more new test values corresponding to one or more existing test points.

2. The method according to claim 1, further comprising: generating the target test case by randomly assigning test values from the plurality of test values to the plurality of test points.

3. The method according to claim 1, wherein excluding the target test case from the set of test cases comprises removing the target test case from the set of test cases.

4. The method according to claim 1, further comprising: determining test coverage for the set of test cases by comparing the number of different combinations of the test values included in the set of test cases with a total number of different combinations of the plurality of test values for the plurality of test points.

5. The method according to claim 1, further comprising: invoking a plurality of interface functions corresponding to the plurality of test points using the test values for the plurality of test points in respective test cases in the set of test cases as inputs to test the code, the plurality of interface functions assigning the test values in the respective test cases to the corresponding test points.

6. The method according to claim 1, wherein the set of test cases is a first set of test cases, the method further comprising:
in response to determining that each of combinations of the test values assigned to at least two of the plurality of test points in the target test case is present in the first set of test cases, comparing the target test case with a second set of test cases;
in response to determining that at least one of combinations of the test values assigned to at least two of the plurality of test points in the target test case is different from each of combinations of the test values for the at least two test points in the second set of test cases, adding the target test case into the second set of test cases; and
randomly selecting at least one test case from the first and second sets of test cases to test the code.

7. A device for testing code, including one or more processors and one or more memories configured to perform operations, comprising:
identifying a plurality of test points in the code and a plurality of test values to be assigned to the plurality of test points, at least one of the plurality of test points to be assigned with two or more test values;
comparing a target test case with a set of test cases, the target test case and the set of test cases being associated with the plurality of test points to determine whether the target test case increases a number of different combinations of the plurality of test values present in the set of test cases;
in response to determining that each of combinations of the test values assigned to at least two of the plurality of test points in the target test case is present in the set of test cases indicating the target test case does not increase the number of different combinations of the plurality of test values present in the set of test cases, excluding the target test case from the set of test cases;
in response to determining that at least one of combinations of the test values assigned to at least two of the plurality of test points in the target test case is different from each of combinations of the test values for the at least two test points in the set of test cases, adding the target test case into the set of test cases based on a number of test cases included in the set of test cases;
executing the code using the set of test cases to generate one or more results;
generating a notification indicating that at least one test case of the set of test cases corresponds to a defect in response to at least one result of the one or more results being inconsistent with an expected result;

in response to generating a notification indicating that at least one test case of the set of test cases corresponds to a defect, identifying and assigning at least one new test point associated with the defect;

determining whether further testing for the at least one new test point and at least one corresponding test value is needed; and generating a new set of test cases based on the at least one new test point and one or more new test values corresponding to one or more existing test points.

8. The device according to claim 7, wherein the operations further comprise generating the target test case by randomly assigning test values from the plurality of test values to the plurality of test points.

9. The device according to claim 7, wherein the operations further comprise removing the target test case from the set of test cases.

10. The device according to claim 7, wherein the operations further comprise determining test coverage for the set of test cases by comparing the number of different combinations of the test values included in the set of test cases with a total number of different combinations of the plurality of test values for the plurality of test points.

11. The device according to claim 7, wherein the operations further comprise invoking a plurality of interface functions corresponding to the plurality of test points using the test values for the plurality of test points in respective test cases in the set of test cases as inputs to test the code, the plurality of interface functions assigning the test values in the respective test cases to the corresponding test points.

12. The device according to claim 7, wherein the set of test cases is a first set of test cases, the operations further comprising:

in response to determining that each of combinations of the test values assigned to at least two of the plurality of test points in the target test case is present in the first set of test cases, comparing the target test case with a second set of test cases;

in response to determining that at least one of combinations of the test values assigned to at least two of the plurality of test points in the target test case is different from each of combinations of the test values for the at least two test points in the second set of test cases, adding the target test case into the second set of test cases; and randomly selecting at least one test case from the first and second sets of test cases to test the code.

13. A computer program product for testing code, the computer program product comprising:

a non-transitory computer readable medium encoded with computer-executable code, the code configured to enable the execution of:

identifying a plurality of test points in the code and a plurality of test values to be assigned to the plurality of test points, at least one of the plurality of test points to be assigned with two or more test values;

comparing a target test case with a set of test cases, the target test case and the set of test cases being associated with the plurality of test points to determine whether the target test case increases a number of different combinations of the plurality of test values present in the set of test cases;

in response to determining that each of combinations of the test values assigned to at least two of the plurality of test points in the target test case is present in the set of test cases indicating the target test case does not increase the number of different combinations of the plurality of test values present in the set of test cases, excluding the target test case from the set of test cases; and in response to determining that at least one of combinations of the test values assigned to at least two of the plurality of test points in the target test case is different from each of combinations of the test values for the at least two test points in the set of test cases, adding the target test case into the set of test cases based on a number of test cases included in the set of test cases;

executing the code using the set of test cases to generate one or more results;

generating a notification indicating that at least one test case of the set of test cases corresponds to a defect in response to at least one result of the one or more results being inconsistent with an expected result;

in response to generating a notification indicating that at least one test case of the set of test cases corresponds to a defect, identifying and assigning at least one new test point associated with the defect;

determining whether further testing for the at least one new test point and at least one corresponding test value is needed; and generating a new set of test cases based on the at least one new test point and one or more new test values corresponding to one or more existing test points.

* * * * *